(12) United States Patent
Lahiff (10) Patent No.: US 6,924,050 B2
(45) Date of Patent: Aug. 2, 2005

(54) METHOD FOR DISSIPATING ENERGY IN A FUEL CELL GENERATOR SYSTEM

(75) Inventor: Mark Steven Lahiff, Riverview, MI (US)

(73) Assignee: Ford Motor Company, Dearborn, MI (US)

( * ) Notice: Subject to any disclaimer, the term of this patent is extended or adjusted under 35 U.S.C. 154(b) by 375 days.

(21) Appl. No.: 09/682,683

(22) Filed: Oct. 5, 2001

(65) Prior Publication Data

US 2003/0068538 A1 Apr. 10, 2003

(51) Int. Cl.[7] .............................. H01M 8/04; B60T 8/00
(52) U.S. Cl. ........................ 429/23; 303/20; 303/152; 429/13
(58) Field of Search .......................... 429/13, 23, 17; 303/152

(56) References Cited

U.S. PATENT DOCUMENTS

| | | |
|---|---|---|
| 4,729,930 A | 3/1988 | Beal et al. |
| 5,345,761 A | 9/1994 | King et al. |
| 5,434,016 A | 7/1995 | Benz et al. |
| 5,771,476 A | 6/1998 | Mufford et al. |
| 5,780,981 A | 7/1998 | Sonntag et al. |
| 5,991,670 A | 11/1999 | Mufford et al. |
| 6,007,930 A | 12/1999 | Adams et al. |
| 6,025,083 A | 2/2000 | Veyo et al. |
| 6,040,561 A | 3/2000 | Murty |
| 6,488,345 B1 * | 12/2002 | Woody et al. ............... 303/152 |

* cited by examiner

Primary Examiner—Mark Ruthkosky
(74) Attorney, Agent, or Firm—Dykema Gossett PLLC; Carlos L. Hanze (57) ABSTRACT

A method and apparatus for dissipating energy in a fuel cell generator system is provided. The method comprises determining an amount of electric power to be dissipated, operating a compressor to draw electric current as required to dissipate the determined amount of electric power, and valving the compressor to reduce the delivery of gas containing oxygen to the fuel cell stack. Valving the compressor includes restricting the flow of gas containing oxygen into the compressor, as well as venting gas containing oxygen to the atmosphere. Valving the compressor also includes inefficiently operating the compressor to reduce the flow of gas containing oxygen to the fuel cell stack. Such electrical power to be dissipated may be generated from a regenerative braking system of a vehicle, or from the minimum amount of electrical power that the fuel cell system can generate.

7 Claims, 8 Drawing Sheets

METHOD FOR DISSIPATING ENERGY IN A FUEL CELL GENERATOR SYSTEM

BACKGROUND OF THE INVENTION

This invention relates to fuel cell generator systems, and in particular to a method and apparatus for dissipating electrical energy in fuel cell generator systems.

As described in U.S. Pat. No. 6,007,930, Adams et al., incorporated herein by reference, fuel cells generate direct current electricity from chemical fuel and oxygen. A fuel cell includes an anode that receives a fuel containing hydrogen, a cathode that receives a gas containing oxygen, such as air, an electrolytic layer between the anode and cathode that conducts positively charged ions, and a catalyst that facilitates the chemical reaction. As the voltage generated by a single fuel cell can be relatively small compared with the requirements of many electrically powered devices, such as an electrically powered vehicle, individual fuel cells are typically combined into one or more fuel cell stacks.

Fuel cell stacks can be used to power vehicles with electric motors. U.S. Pat. No. 5,780,981, Sonntag et al., incorporated herein by reference, discloses a process for controlling the electric power generated by a fuel cell of a vehicle as a function of an accelerator pedal position, by adjusting the rotational speed of an air compressor that supplies air to the fuel cell.

Vehicles that incorporate fuel cells may also employ a regenerative braking system which allows the electric motor to function as a generator during vehicle braking, thereby converting kinetic energy of the vehicle into electric energy. Such regenerated energy may be stored in a device for storing electric power, such as a battery, for discharge at a future time. U.S. Pat. No. 5,345,761, King et al., incorporated by reference herein, discloses such a regenerative braking system.

When a driver releases the accelerator pedal to slow a vehicle, it is desirable for the vehicle to decelerate at the same rate for each event under the same conditions for driver comfort and safety. A regenerative braking system can affect deceleration characteristics.

Some of the electric current produced by regenerative braking can be used to run vehicle electrical loads. In the case where less than a fully charged battery is available, the braking energy can be used to recharge the battery. However, in a vehicle powered by a fuel cell generator any regenerated electrical power that is not used to power electrical loads or to recharge a battery must be dissipated. This is because directing an electrical current into a fuel cell will damage or destroy the cell. Therefore, a difficulty may arise in vehicles that incorporate both fuel cell generator systems and regenerative braking systems since the electricity generated must not flow into the fuel cells of such systems.

In addition, fuel cell generator systems require the draw of one or more electrical loads at least equivalent to the minimum amount of electrical power that the fuel cell system can generate. Otherwise, an insufficient amount of fuel and oxygen will be supplied to the fuel cell generator system, causing the fuel cell system to cease operation and requiring it to be restarted when additional electrical power is required.

One solution to the problem of dissipating excess energy is to employ a resistor to dissipate electrical power. U.S. Pat. No. 6,025,083 Veyo et al., for example, discloses an apparatus and method for dissipating excess energy of a fuel cell through a resistor. However, such a method may require additional considerations such as providing a cooling system to control the heat energy produced by the resistor. Moreover the large size and expensive cost of such resistors further impede the efficiency of such a system.

Accordingly, it is desirable to provide a method and apparatus to dissipate electrical energy in a fuel cell generator system.

SUMMARY OF THE INVENTION

In response to the disadvantages of the prior art, the present invention provides a method and apparatus for dissipating electrical energy in a fuel cell generator system.

According to one embodiment of the present invention, a method for dissipating electrical power output in a fuel cell power system is disclosed. The fuel cell power system includes a fuel cell stack for generating electric power and a compressor for delivering gas containing oxygen to the fuel cell stack. The method includes the steps of determining an amount of electrical power to be dissipated, operating the compressor to draw electrical current as required to dissipate the power, and valving the compressor to reduce the delivery of gas containing oxygen to the fuel cell stack. One method of valving the compressor includes the step of restricting the flow of gas containing oxygen into the compressor. A second method of valving the compressor includes the step of venting the output of the compressor to the atmosphere. A third method of valving the compressor is to operate the compressor in an inefficient manner to dissipate the determined amount of electrical energy.

Another feature of the present invention is to provide a method of dissipating electrical power in a vehicle having a fuel cell power system and a regenerative braking system. First, an amount of electrical power to be dissipated is determined by adding the minimum amount electrical power that can be generated by the fuel cell stack to the amount of electrical power generated by the regenerative braking system, and subtracting the amount of electrical power required by the vehicle. The compressor is operated to draw electric current as required to dissipate the power and the compressor is valved at its inlet or outlet to reduce the delivery of gas containing oxygen to the fuel cell stack.

A further feature of this invention is to provide an apparatus for dissipating electrical energy in a vehicle having a fuel cell power system and a regenerative braking system. An air compressor draws the electrical power to be dissipated and an adjustable valve restricts the flow of gas containing oxygen to the fuel cell stack.

Accordingly, an advantage of the present invention is to provide a method and apparatus for dissipating electrical energy in a fuel cell generator system to prevent electrical current from entering into the system.

Another advantage of the present invention is to provide a method and apparatus for dissipating electrical energy in a vehicle having a fuel cell generator system and a regenerative braking system.

These and other advantages of this invention will become apparent to one skilled in the art from the following detailed description and the accompanying drawings illustrating features of this invention by way of example.

DETAILED DESCRIPTION

Figure 1:
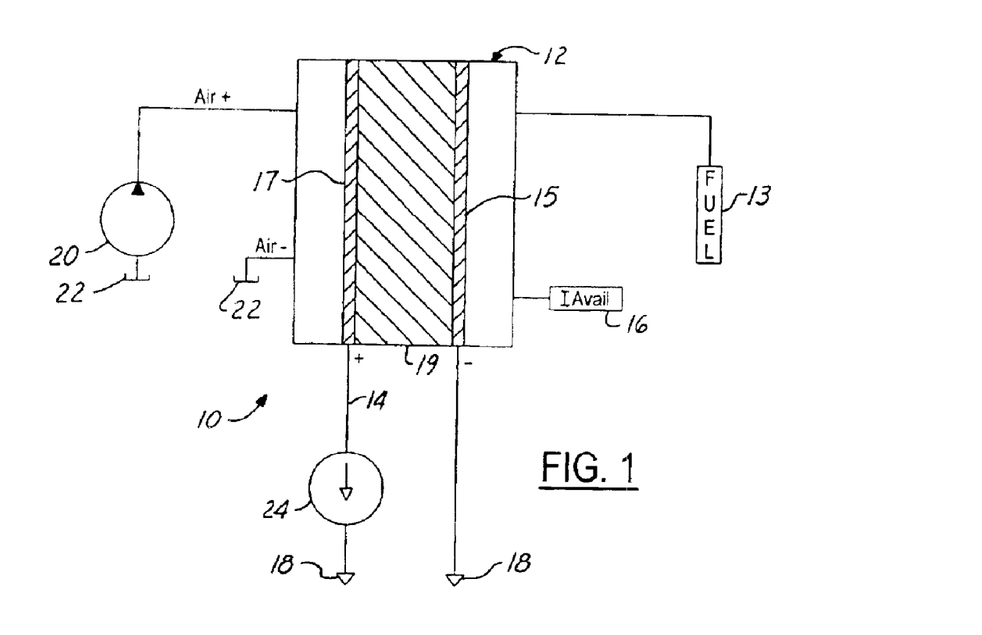
FIG. 1 is a block diagram of a fuel cell system.

Referring now to the drawings wherein reference numerals are used to identify identical components in the various views, FIG. 1 illustrates fuel cell power system 10. Fuel cell power system 10 may include a fuel cell stack 12, a compressor 20, and a source of fuel containing hydrogen 13. Fuel cell power system 10 generates an electric voltage 14 and provides an electrical current 16.

Fuel cell stack 12 is conventional in the art and is made up of one or more fuel cells. Fuel cell stack 12 has an anode 15 for receiving a fuel containing hydrogen, a cathode 17 for receiving a gas containing oxygen, an electrolytic layer 19 between the anode and cathode, and a catalyst, commonly platinum based, to facilitate the reaction between the oxygen and hydrogen. Fuel stack 12 operates in a conventional manner to continuously generate electrical power to a load 24 by supplying fuel containing hydrogen 13 to the anode 15, and a gas containing oxygen to the cathode. Fuel containing hydrogen 13 may be hydrogen gas, or another fuel containing hydrogen atoms, such as gasoline or methanol, which may be reformed prior to fueling the fuel cell or be directly supplied to the fuel cell. The voltage potential 14 generated by fuel stack 12 is with reference to ground 18. The gas containing oxygen may be provided to fuel cell stack 12 by compressor 20. Compressor 20 may supply air from the atmosphere 22 to the cathode in fuel cell stack 12. Compressor 20 may alternatively be referred to as a pump.

Figure 2:
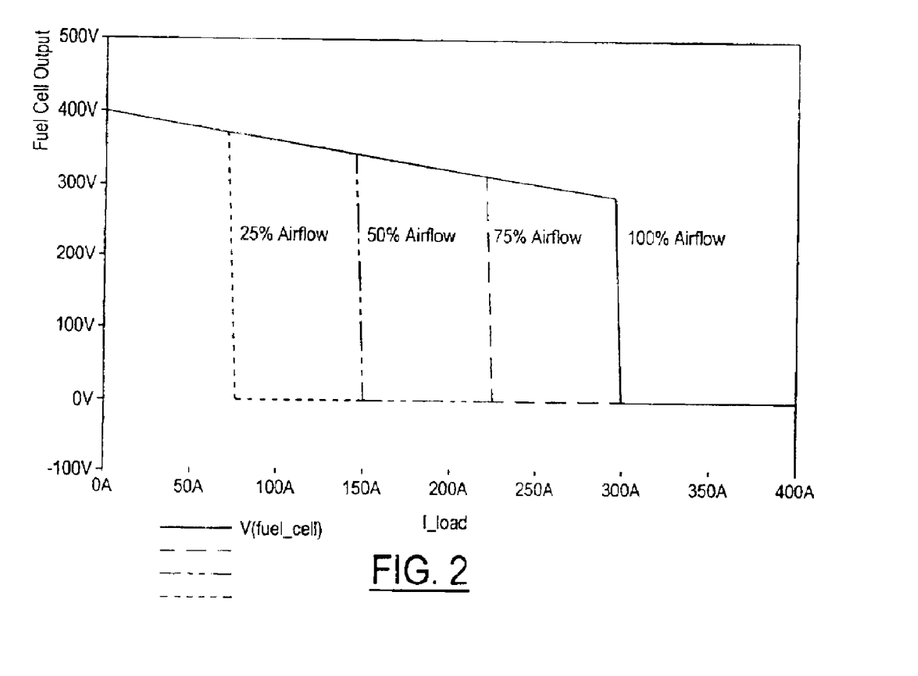
FIG. 2 is an exemplary graph showing a polarization curve for a fuel cell system in accordance with FIG. 1.

With reference to both FIGS. 1 and 2, the electrical power generated by fuel cell stack 12 can be regulated by the amount of gas containing oxygen supplied by compressor 20. For example, fuel cell stack 12 may have an open circuit voltage of 400 volts. With 100% of the air flow from compressor 20, this may decrease to 300 volts when drawing 250 amperes. The output of fuel cell stack 12 decreases rapidly when more current is drawn than can be generated by the gas containing oxygen supplied by compressor 20. For example, with 25% air flow from compressor 20, load 24 may be able to draw 75 amperes; with 50% air flow load 24 may be able to draw 150 amperes, with 75% air flow load 24 may be able to draw 225 amperes, and with 100% air flow load 24 may be able to draw 300 amperes before voltage 14 of fuel cell stack 12 drops to zero, or near zero volts.

Figure 3:
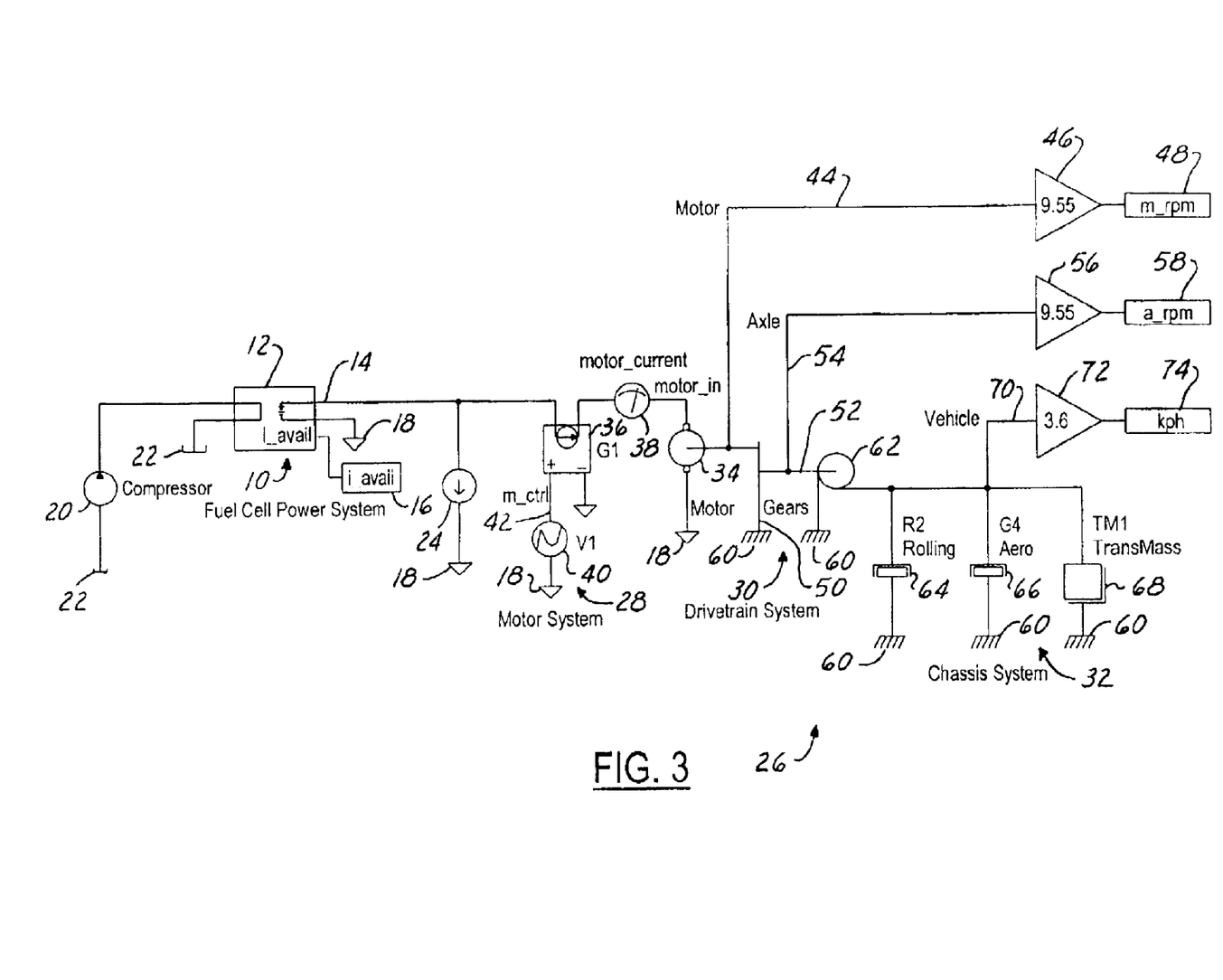
FIG. 3 is a block diagram of a vehicle model having a fuel cell generator.

Referring now to FIG. 3, a block diagram of a vehicle 26 having a fuel cell generator is shown. Vehicle 26 includes fuel cell power system 10, motor system 28, drivetrain system 30, and chassis system 32.

Figure 9:
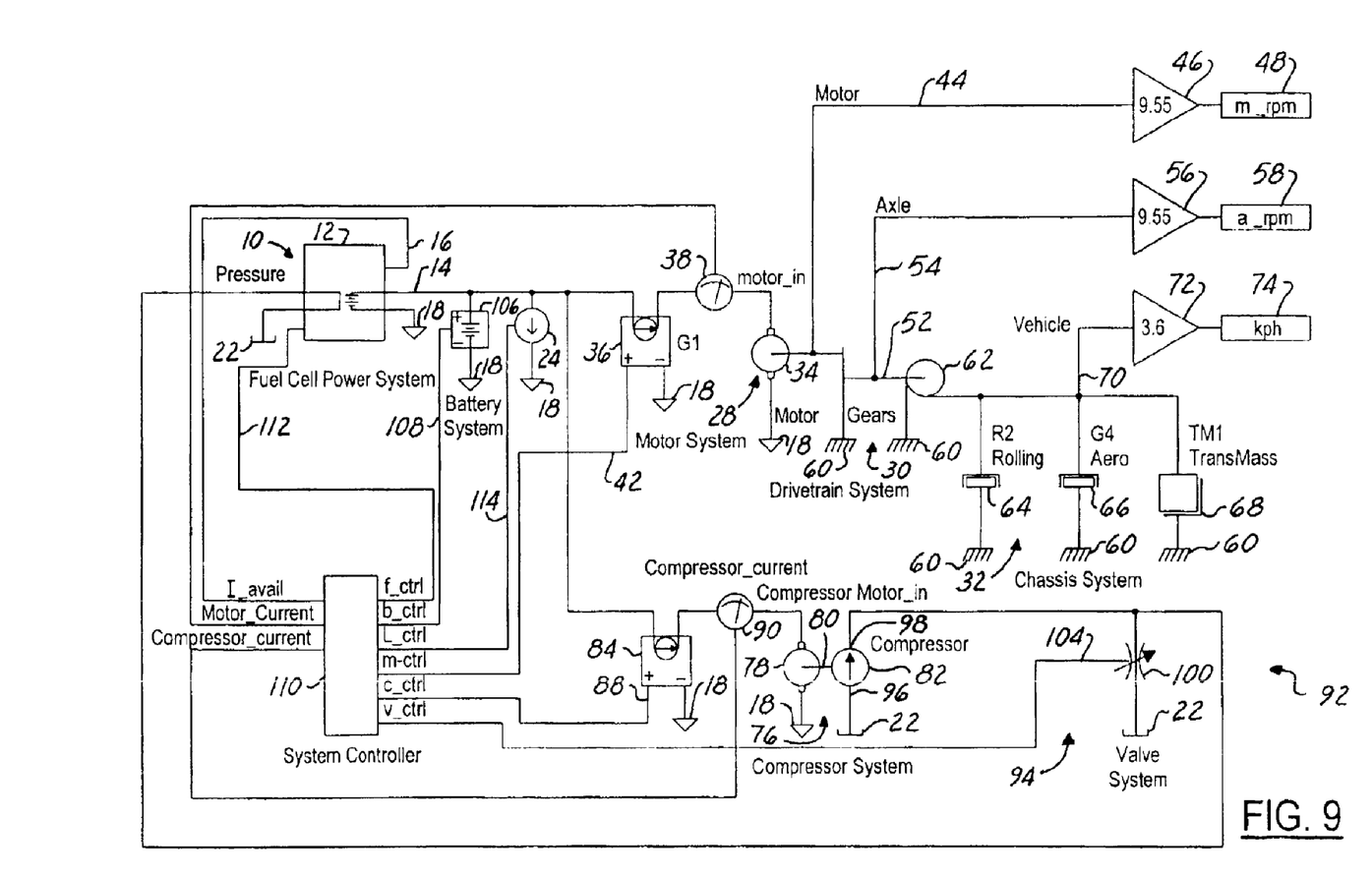
FIG. 9 is a block diagram of a vehicle model in accordance with the present invention having a fuel cell generator with a compressor to provide the fuel cell with the necessary air flow and a valve to vent gas containing oxygen to the atmosphere.

As described in FIG. 1, fuel cell power system 10 is provided to generate electrical power for the vehicle. While depicted with less detail, fuel cell power system 10 in FIG. 3 represents fuel cell power system 10 of FIG. 1. The electrical power generated by fuel cell power system 10 may be stored in an electrical storage device, such as battery 106 as shown in FIG. 9. With continued reference to FIG. 3, load 24 of fuel cell power system 10 in vehicle 26 may include vehicle entertainment systems, power windows, power door locks, windshield wiper motors, air blowers, heaters, lighting systems, communication systems, and other electrically powered vehicle accessories.

Motor system 28 is to provided to propel the vehicle, and may include one or more electric traction motors 34, a motor voltage controlled current source 36, a motor electrical current measurement device 38, and a motor current signal processor 40. Electric traction motor 34 is conventional in the art, and is operable both to drive the wheels of the vehicle and to be driven by the wheels so as to generate electricity during regenerative braking. Other embodiments not shown can have a separate drive and regenerative braking axles. Motor 34 has a rotational speed measured in radians per second 44 which may be converted through a processor 46 to provide a motor speed in revolutions per minute 48. The electricity generated by motor 34 during regenerative braking can be stored in a storage device, such as battery 106 as shown in FIG. 9. Electric traction motor 34 can receive electrical power from fuel cell power system 10, or from a storage battery. Motor current signal processor 40 is provided as part of a system controller, such as system controller 110 as shown in FIG. 9, and generates a signal 42, m_ctrl that controls motor current. Motor voltage controlled current source 36 adjusts the electrical current going into motor 34, based on signal 42. Electrical current measurement device 38 is provided to measure the electrical current supplied to motor 34. Motor system 28 is conventional in the art.

Drivetrain system 30 is provided to transfer power from motor 34 to one or more driving wheels 62. Drivetrain system 30 includes a gear system 50 for transferring the output of motor 34 to at least one driving axle 52. Driving axle 52 rotates at a speed 54 with respect to the ground 60. Driving axle speed 54 is provided in radians per second, which may be converted through a processor 56 to provide a motor speed in revolutions per minute 58. Driving axle 52 supports and rotates driving wheel 62 to propel the vehicle.

Drivetrain system 30 propels vehicle 26 at a speed 70, provided in meters per second. A processor 72 may convert this speed into kilometers per hour (kph) 74. Vehicle speed 70 is affected by factors in chassis system 32, including the frictional force 64 between the vehicle tires and the ground, the aerodynamic resistance 66 of vehicle 26, and the mass 68 of vehicle 26.

Figure 4:
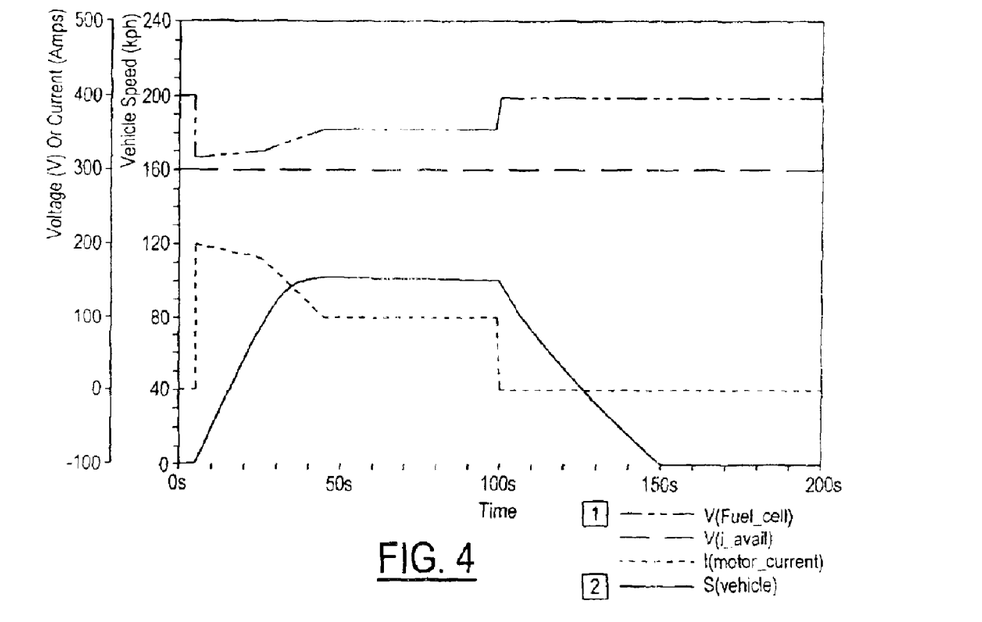
FIG. 4 is an exemplary graph showing fuel cell voltage, fuel cell current supply, and vehicle motor current as a function of time, and showing vehicle speed as a function of time for a fuel cell powered vehicle in accordance with FIG. 3.

With reference to both FIGS. 3 and 4, an example is presented in which m_ctrl signal 42 is generated to accelerate vehicle 26 to 100 kph, maintain the vehicle speed until time 100 seconds, and then coast vehicle 26 to 0 kph without the use of regenerative braking. Fuel cell stack voltage 14 drops as electrical current is drawn to accelerate vehicle 26 to 100 kph and to maintain vehicle speed. Voltage 14 returns to almost 400 volts when current is reduced during coast down. In this example, coast down occurs in about 50 seconds without regenerative braking. Fuel cell stack 12 provides a voltage 14 in the 300–400 volt range, and produces an available current 16 of about 300 amperes.

Figure 5:
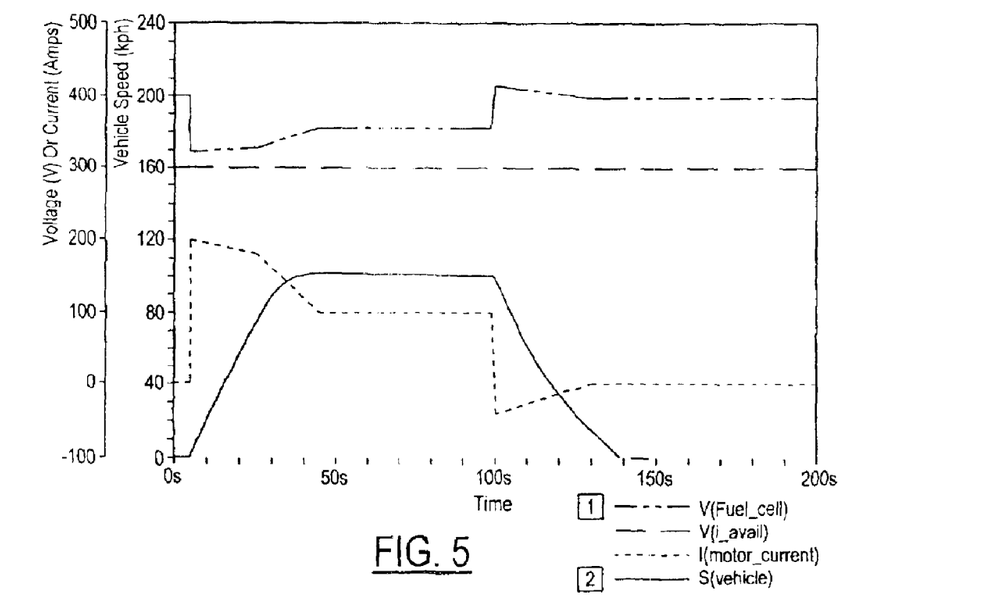
FIG. 5 is another exemplary graph showing fuel cell voltage, fuel cell current supply, and vehicle motor current as a function of time, and showing vehicle speed as a function of time for a fuel cell powered vehicle in accordance with FIG. 3 employing a regenerative braking system.

With reference to both FIGS. 3 and 5, the example in FIG. 4 is repeated, but vehicle 26 is braked to 0 kph with the use of regenerative braking. In this example, an electrical power storage device, or battery, is either not present, is fully charged, or is otherwise incapable of storing the electrical power regenerated. FIG. 5 demonstrates that in such a situation, coast time for vehicle 26 is reduced to 40 seconds with regenerative braking. Fuel cell stack 12 provides an available current 16 of 300 amperes. The electrical current of motor 34 goes negative at 100 seconds and ramps to zero at 130 seconds, representing the electricity generated during regenerative braking. However, the electricity generated during regenerative braking results in fuel cell stack output voltage 14 rising above 400 volts at 100 seconds. This implies current flow into fuel cell stack 12, which can cause fuel cell stack 12 to be damaged or destroyed.

Figure 6:
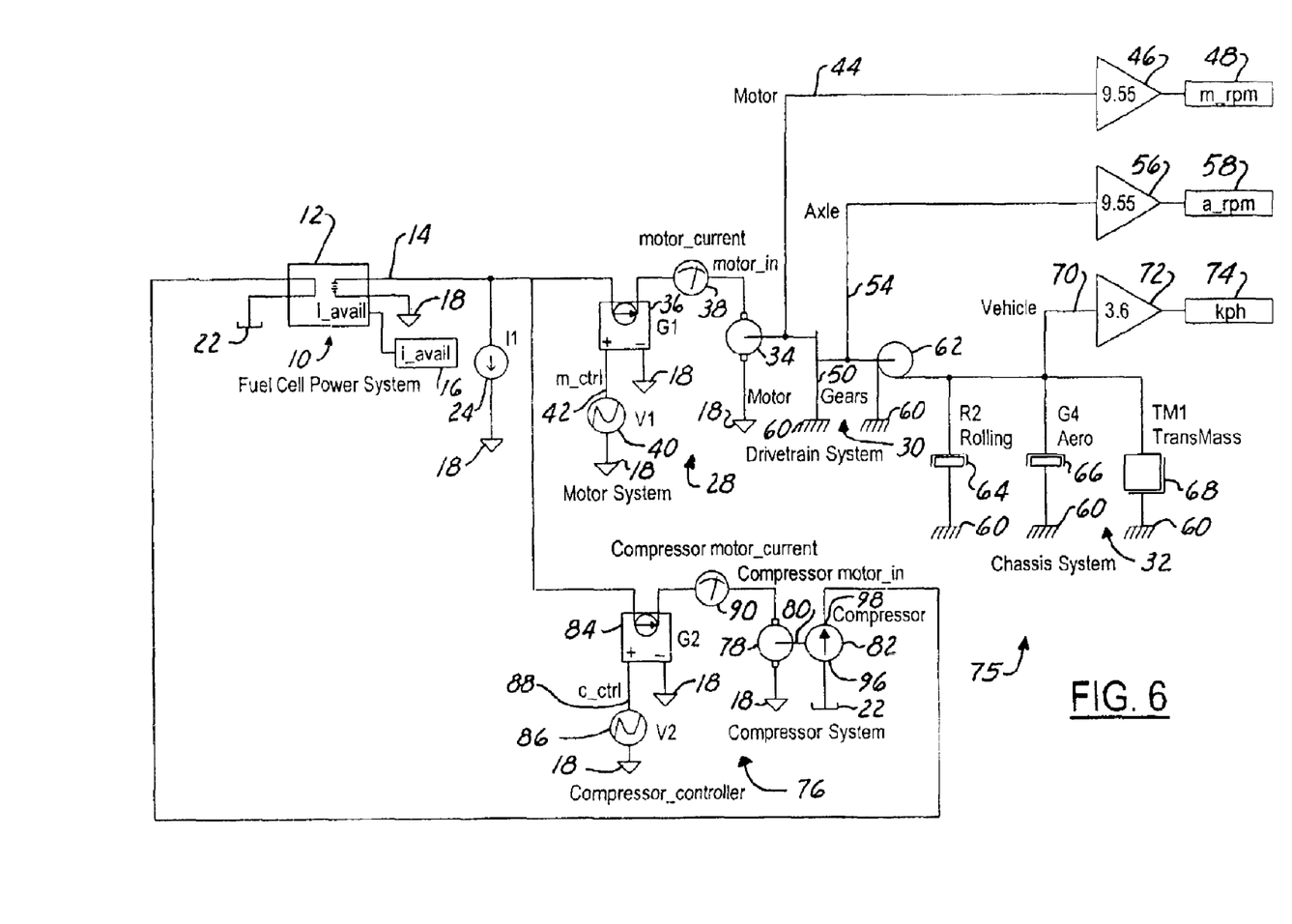
FIG. 6 is a block diagram of a vehicle model having a fuel cell generator with a compressor to provide the fuel cell with the necessary air flow.

Referring to FIG. 6, a block diagram of a vehicle 75 having a fuel cell generator is shown. Vehicle 75 includes the identical systems of vehicle 26 in FIG. 3, except that vehicle 75 is presented with a modification to compressor 20. In place of compressor 20 is compressor system 76. Compressor system 76 includes compressor motor 78, air compressor 82, a compressor voltage controlled current source 84, a compressor electrical current measurement device 90, and a compressor current signal processor 86. Compressor motor 78 is an electrically powered motor and is conventional in the art. Compressor motor 78 has an output shaft 80 that drives compressor 82. Compressor motor 78 can receive electrical power from fuel cell power system 10, or from a storage battery, such battery 106 as shown in FIG. 9.

Compressor 82 supplies air or other gas containing oxygen to the cathode in fuel cell stack 12. Compressor 82 includes an inlet 96 for receiving air from the atmosphere 22, and an outlet 98 from which air is supplied to fuel cell stack 12 at a pressure higher than the pressure of the atmosphere 22. Compressor 82 is conventional in the art.

Compressor current signal processor 86 is provided as part of a system controller, such as system controller 110 shown in FIG. 9, and generates a signal 88, c_ctrl, that controls compressor current. Compressor voltage controlled current source 84 adjusts the electrical current being supplied to compressor motor 78, based on signal 88. Compressor electrical current measurement device 90 is provided to measure the electrical current supplied to compressor motor 78. Compressor system 76 is conventional in the art.

Figure 7:
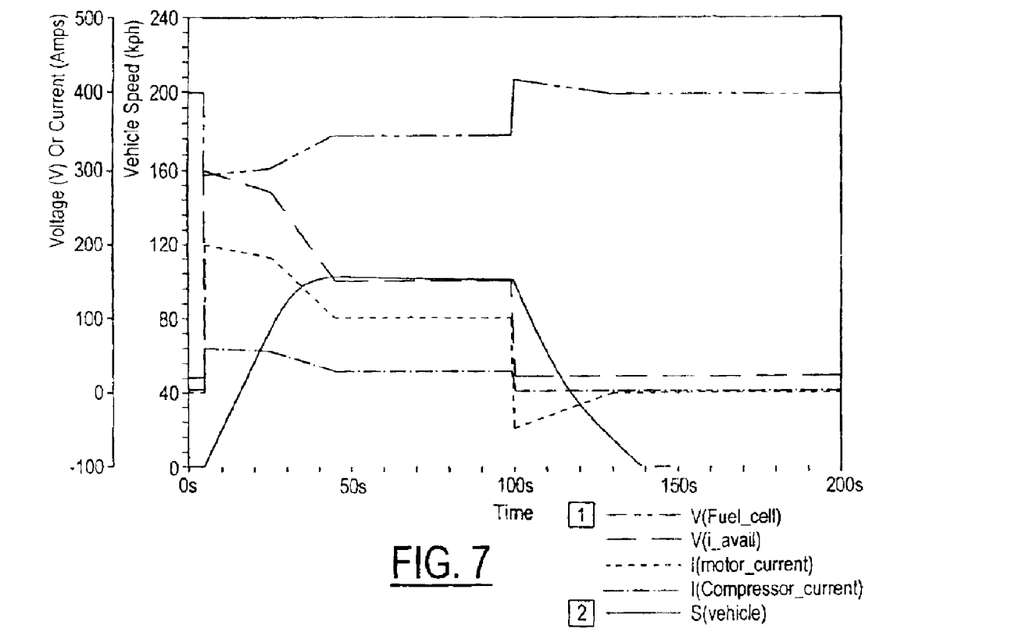
FIG. 7 is an exemplary graph showing fuel cell voltage, fuel cell current supply, vehicle motor current, and compressor current as a function of time, and showing vehicle speed as a function of time for a fuel cell powered vehicle in accordance with FIG. 6.

With reference to both FIGS. 6 and 7, an example is provided in which m_ctrl signal 42 is generated to accelerate vehicle 75 to 100 kph, maintain the vehicle speed until time 100 seconds, and then coast vehicle 75 to 0 kph through the use of regenerative braking. In FIG. 7, compressor current signal processor 86 generates a relatively small signal 88 c_ctrl while vehicle 75 is decelerating after 100 seconds, resulting in a negligible, or near zero, electrical current being supplied to compressor motor 78 after 100 seconds. The electrical current of motor 34 goes negative at 100 seconds and ramps to zero at 130 seconds, representing the electricity generated during regenerative braking. As in the example of FIG. 4, an electrical power storage device, or battery, is not present or is otherwise incapable of storing the electrical power regenerated. Accordingly, the electricity generated during regenerative braking results in fuel cell stack output voltage 14 to rise above 400 volts at 100 seconds. This implies current flow into fuel cell stack 12, which causes fuel cell stack 12 to be damaged or destroyed.

Figure 8:
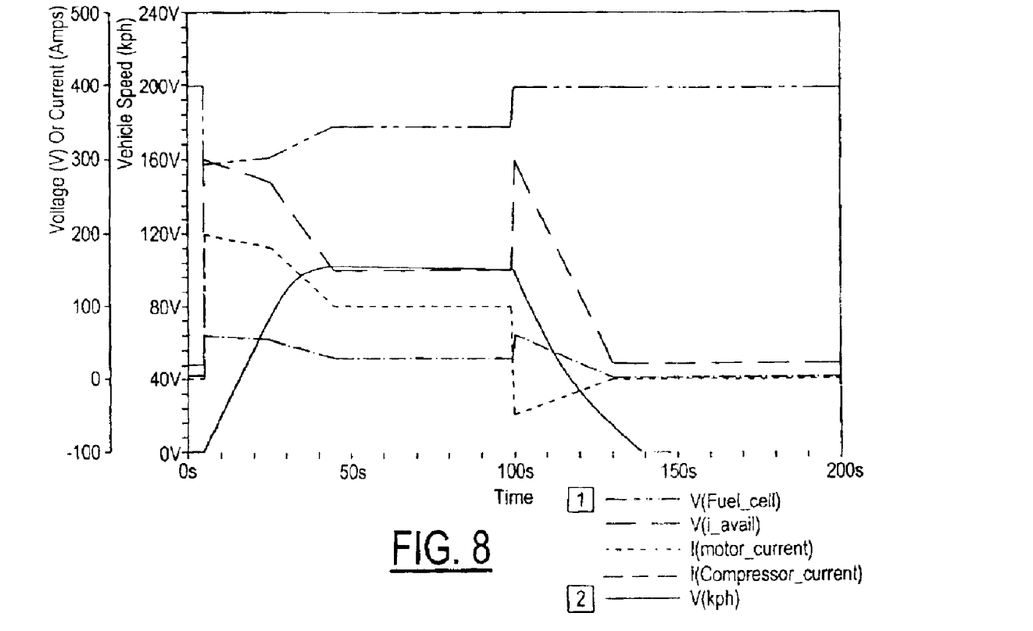
FIG. 8 is another exemplary graph showing fuel cell voltage, fuel cell current supply, vehicle motor current, and compressor current as a function of time, and showing vehicle speed as a function of time for a fuel cell powered vehicle in accordance with FIG. 6.

Referring to both FIGS. 6 and 8, the example of FIG. 7 is repeated, however compressor current signal processor 86 increases signal 88 c_ctrl to create an electrical load at compressor motor 78 necessary to draw the electrical current generated by regenerative braking while vehicle 75 is decelerating. In this example, the electrical current of motor 34 goes negative at 100 seconds and ramps to zero at 130 seconds, representing the electricity generated during regenerative braking. The electrical current to compressor motor 78 increases to a maximum value, in this example 60 amperes, at 100 seconds and ramps to near zero at 130 seconds. However, fuel cell stack available current 16 concurrently rises to 300 amperes at 100 seconds, and ramps to nearly 20 amperes at 130 seconds. Output voltage 14 of fuel cell stack 12 remains below 400 volts during this example, indicating no reverse current flow into fuel cell stack 12.

As demonstrated in the example of FIG. 8, an inventive solution to the problem of preventing reverse current flow into a fuel cell stack is to dissipate surplus electrical energy through an electric motor for the fuel cell system compressor. However, while compressor motor 78 in FIG. 8 provides enough electrical load so that output voltage 14 of fuel cell stack 12 does not rise above the 400 volt open circuit voltage, the increased electrical current to compressor motor 78 results in an increased air flow to fuel cell stack 12 from compressor 82, which causes fuel cell power system 10 to run sub-optimally. This is evidenced by the amount of unnecessary current available 16 between 100 and 130 seconds.

FIG. 9 presents a preferred embodiment of the present invention in which compressor system 76 is operable a rate sufficient to prevent electric current from flowing into fuel cell stack 12, but the air flow to fuel cell stack 12 is controllable to prevent fuel cell power system 10 from operating sub-optimally. FIG. 9 presents a block diagram of a vehicle 92 having a fuel cell generator system 10. Vehicle 92 includes the identical systems of vehicle 75 in FIG. 6, and includes the depiction of battery 106 and system controller 110. Vehicle 92 further includes control signal 112 f_ctrl to which fuel cell power system 10 is responsive, and control signal 114 l_ctrl to which load 24 is responsive. Additionally, vehicle 92 includes valve system 94.

Battery 106 is provided to store and dissipate electrical power. Battery 106 is conventional in the art and stores electrical power generated by fuel cell power system 10 or generated by motor 34 during regenerative braking. Battery 106 dissipates stored electrical energy to electrically powered systems of vehicle 92 including motor system 28, compressor system 76, and valve system 94. Battery 106 is responsive to signal 108 b_ctrl, generated by system controller 110.

Valve system 94 includes a controllable valve 100 responsive to control signal 104, v_ctrl. Valve system 94 regulates the air flow from compressor 82 to fuel cell stack 12.

Valve 100 is provided to restrict the flow of air to fuel cell stack 12. Valve 100 is conventional in the art. Valve system 94 includes a signal processor provided as part of system controller 110, and which generates signal 104, v_ctrl, that controls valve 100.

With continued reference to FIG. 9, valve 100 may be positioned at or downstream of compressor outlet 98. In this embodiment, when valve 100 is closed, air is directed from compressor 82 to fuel cell stack 12. Conversely, when valve 100 is open in this embodiment, some or all air from compressor 82 is vented to the atmosphere 22, rather than being supplied to fuel cell stack 12.

Figure 10:
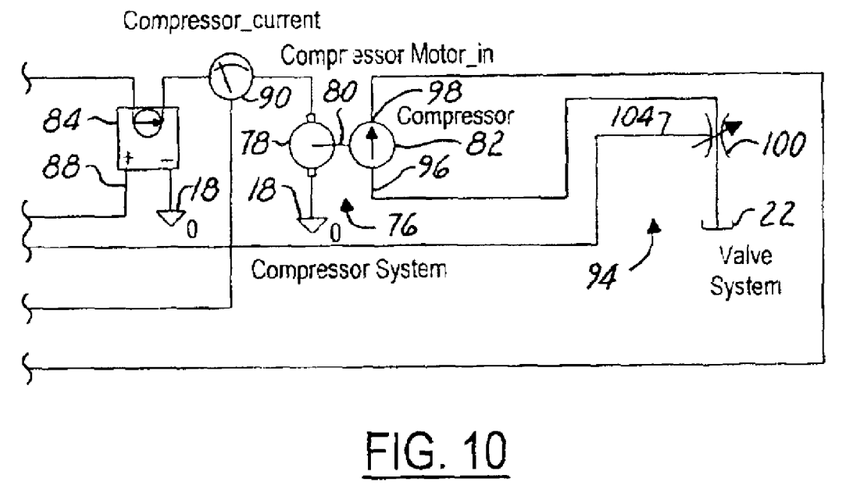
FIG. 10 is a block diagram partially of the vehicle model of FIG. 9 depicting an alternative embodiment of the inventive method and apparatus.

Alternatively, valve 100 may be positioned at or upstream of compressor inlet 96, as shown in FIG. 10. When positioned at or upstream of compressor inlet 96, valve 100 restricts the flow of air into compressor 82. Upon receiving valve control signal 104 from system controller 110 to close, valve 100 prevents air from entering compressor 82. This situation prevents air from entering fuel cell stack 12, and further causes compressor 82 to generate a vacuum when operating.

Compressor system 76 may also be valved by inefficiently operating compressor system 76 in order to reduce the flow of gas containing oxygen to fuel cell stack 12 while dissipating a determined amount of electrical power. This may be accomplished, for example by providing a variable displacement compressor in compressor system 76, and inefficiently operating the compressor. It will be recognized by those skilled in the art that other methods for inefficiently operating compressor system 76 are available.

System controller 110 is provided to receive and supply signals from and to systems of vehicle 92, including fuel cell power system 10, motor system 28, compressor system 76, and valve system 94. System controller 110 receives signals indicating fuel cell stack available current 16, the current being supplied to or generated by motor 34, and the current being supplied to compressor motor 78. System controller 110 may include motor current signal processor 40, and compressor current signal processor 86. Additionally, system controller 110 may be capable of generating control signal 42 m_ctrl to control motor system 28, control signal 88 c_ctrl to control compressor system 76, control signal 104 v_ctrl to control valve system 94, control signal 108 b_ctrl to control battery 106, control signal 112 f_ctrl to control fuel cell system 10, and control signal 114 l_ctrl to control load 24. Such signals may be analog signals, digital signals, or a hybrid of analog and digital. In addition, system controller 110 may generate feed-forward signals to the respective systems.

System controller 110 also determines the amount of electrical power to be dissipated. System controller 110 sums the electrical power generated by fuel cell power system 10 and the electrical power generated during regenerative braking by motor 34, and subtracts the amount of electrical power required by vehicle 92. If an electrical storage device with storage capacity is available in the vehicle, system controller 110 directs the electrical power to be dissipated to the device. Otherwise, system controller 110 directs the electrical power to be dissipated to compressor system 76. Upon determining that an amount of electrical power needs to be dissipated, system controller 110 generates signal 88 c_ctrl to create an electrical load at compressor motor 78, and generates signal 104 v_ctrl to valve compressor 82 and reduce the flow of gas containing oxygen to fuel cell stack 12.

Figure 11:
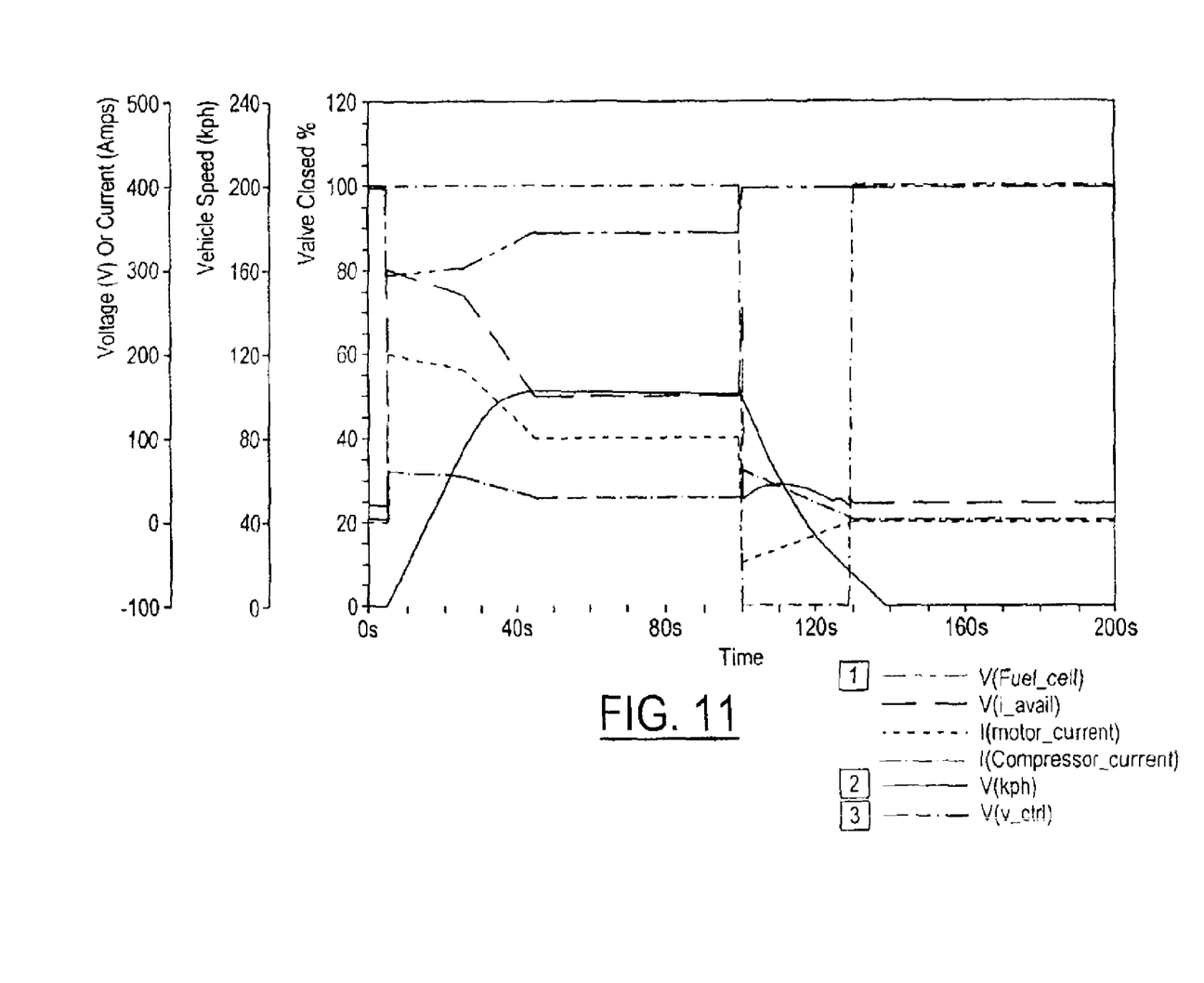
FIG. 11 is an exemplary graph showing fuel cell voltage, fuel cell current supply, vehicle motor current, and compressor current as a function of time; showing vehicle speed as a function of time; and showing percentage of valve closing as a function of time for a fuel cell powered vehicle in accordance with FIGS. 9 and 10.

Referring to both FIGS. 9, and 11, an example is provided for vehicle 92 in which valve system 94 is fluidly connected with compressor system 76. As shown in FIG. 9, in this example, valve 100 is provided at or downstream compressor outlet 98. The end result would be the same, however, if valve 100 were provided at or upstream compressor inlet 96, as shown in FIG. 10. In this example, m_ctrl signal 42 is chosen to accelerate vehicle 92 to 100 kph, maintain the vehicle speed until time 100 seconds, and then coast vehicle 92 to 0 kph through the use of regenerative braking. The electrical current of motor 34 goes negative at 100 seconds and ramps to zero at 130 seconds, representing the electricity generated during regenerative braking. In this example, battery 106 is fully charged and not capable of storing the electrical power regenerated. System controller 110 generates signal 88 c_ctrl to create an electrical load at compressor motor 78 necessary to draw any surplus electrical current generated by regenerative braking while vehicle 75 is decelerating. Concurrently, at 100 seconds, system controller 110 generates signal 104, v_ctrl, to open valve 100 to vent the excess air supplied by compressor 82 as a result of the increased electrical load to compressor motor 78. In FIG. 11, v_ctrl indicates valve percent closed. Valve 100 is fully closed at 100%. In the example of FIG. 11, the electrical current to compressor motor 78 increases to a maximum value at 100 seconds, as a result of the electrical power surplus created by the regenerative braking system. Valve 100 opens at 100 seconds, venting air from compressor 82 to the atmosphere 22. Available current 16 from fuel cell stack 12 is reduced to approximately 20 amperes at 100 seconds, and available output voltage 14 of fuel cell stack 12 remains below 400 volts.

Accordingly, the embodiments disclosed herein achieve the goals set forth. Without providing a resistor to fuel cell power system 10, electrical energy is able to be dissipated through the compressor motor 78, and valving any excess air produced by compressor 82 prevents supplying excess gas containing oxygen to fuel cell stack 12.

While the invention has been particularly shown and described with reference to the preferred embodiments thereof, it is well understood by those skilled in the art that various changes and modifications may be made in the invention without departing from the spirit and scope of the invention.

What is claimed is:

1. A method for dissipating electrical power in a vehicle having a fuel cell power system for generating electricity and having a regenerative braking system for converting kinetic energy into electrical energy, and said vehicle having an electrical power storage device for storing electrical energy from said regenerative braking system and for solving electrical energy to a motor in a drive train of said vehicle; said fuel cell power system including a fuel cell stack of at least one fuel cell for generating electric power and a compressor for delivering gas containing oxygen to said fuel cell stack, said method comprising:

determining an amount of said electrical power to be dissipated by summing the minimum amount of electrical power that can be generated by said fuel cell system and said regenerative braking system, and subtracting an amount of electrical power required by said vehicle and subtracting the amount of electrical power capable of being stored in said electrical power storage device;

operating said compressor to draw electric current as required to dissipate said amount of said electrical power; and valving said compressor to reduce delivery of gas to said fuel cell stack.

2. The method of claim 1 wherein valving said compressor to reduce delivery of gas to said fuel cell stack comprises restricting the flow of said gas.

3. The method of claim 2 wherein the step of restricting the flow of gas containing oxygen further comprises restricting an input of said compressor and wherein said compressor creates a vacuum.

4. The method of claim 1 wherein valving said compressor comprises venting an output of said compressor.

5. The method of claim 4 wherein said compressor is vented to the atmosphere.

6. The method of claim 1 wherein the step of operating said compressor to draw an electrical power load equivalent to said determined amount of said electrical power to be dissipated further comprises generating a feed-forward output signal to adjust said compressor speed to draw an electrical load equivalent to said determined amount of said electrical power to be dissipated.

7. The method of claim 1 wherein the step of valving said compressor further comprises inefficiently operating said compressor to reduce delivery of said gas to said fuel cell stack.

* * * * *